No. 794,694. PATENTED JULY 11, 1905.
W. E. ALLEN.
BOBBIN CLUTCH FOR ROTATABLE SPINDLES.
APPLICATION FILED MAY 1, 1905.
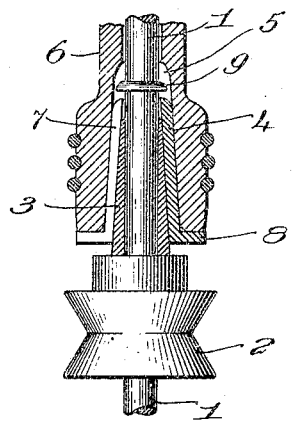
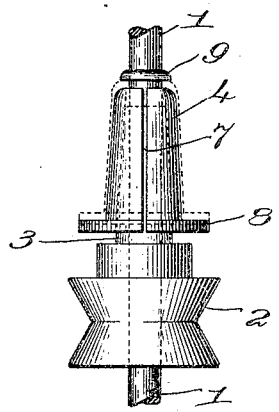
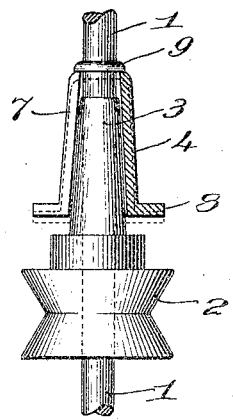
Witnesses
Edward F. Allen
Thomas J. Drummond
Inventor
William E. Allen
By Crosby Gregory
Attys No. 794,694. Patented July 11, 1905.

UNITED STATES PATENT OFFICE.

WILLIAM E. ALLEN, OF SALEM, MASSACHUSETTS, ASSIGNOR TO SAWYER SPINDLE COMPANY, OF PORTLAND, MAINE.

BOBBIN-CLUTCH FOR ROTATABLE SPINDLES.

SPECIFICATION forming part of Letters Patent No. 794,694, dated July 11, 1905.

Application filed May 1, 1905. Serial No. 258,187.

*To all whom it may concern:*

Be it known that I, WILLIAM E. ALLEN, a citizen of the United States, and a resident of Salem, county of Essex, State of Massachusetts, have invented an Improvement in Bobbin-Clutches for Rotatable Spindles, of which the following description, in connection with the accompanying drawings, is a specification, like figures on the drawings representing like parts.

This invention has for its object the production of a simple and positively-acting clutch to effect the rotation of a bobbin with a rotatable spinning, twisting, or other similar spindle, the application of the bobbin acting to effect expansion of the clutch into driving engagement with the bobbin.

The various novel features of the invention will be fully described in the subjoined specification and particularly pointed out in the following claims.

Figure 1 is a view, partly in section and elevation, of a rotatable spindle with a bobbin-clutch applied thereto embodying one form of my invention, a bobbin being shown as clutched to the spindle. Fig. 2 is a side elevation of the apparatus shown in Fig. 1, omitting the bobbin, the full lines showing the operative position of the clutch; and Fig. 3 is a detail showing the clutch-expander in elevation and the clutch in section, the clutch being shown in full lines in inoperative position and in its operative position by dotted lines.

In the drawings the rotatable spindle 1, of any suitable or usual construction, is provided with an attached whirl 2, by means of which rotation is imparted to the spindle, and the latter above the point of attachment for the whirl is provided with a conical or tapering enlargement 3, constituting a clutch-expander. This clutch-expander may conveniently be made as a sleeve fixedly secured to the spindle and having an internally-conical surface.

A bobbin-clutch is mounted upon the expander, the clutch consisting of an expansible metallic sleeve 4, of such a shape externally as to readily enter and fit the chamber 5 in the base or end of a bobbin 6, (see Fig. 1,) the clutch being slitted longitudinally, as at 7, from end to end and having an annular enlargement 8 at its lower end constituting a bobbin-rest.

Above the clutch a collar 9 is pinned or otherwise secured to the spindle and permitting slight longitudinal movement of the clutch upon the spindle, while preventing removal of the clutch when a bobbin is doffed.

In Fig. 3 the clutch in its full-line position is contracted and is then in readiness to receive a bobbin, the latter being pushed downward onto the clutch, and as it engages the rest 8 it will force the clutch down into dotted-line position, Fig. 3, or full-line position, Figs. 1 and 2.

The tapered or conical surface of the expander 3 acts at such time to spread or expand the clutch into driving engagement with the interior of the bobbin, (see Fig. 1,) and at the same time the clutch is caused to clamp or grip upon the expander 3. The bobbin is thus fixedly connected with the spindle to rotate therewith.

When the bobbin is doffed, the upward movement thereof draws the clutch upward toward the smaller part of the expander and permits the clutch to contract and release the bobbin.

It will be seen that the construction is extremely simple, strong, and durable and the clutch action is effective and firm.

Having fully described my invention, what I claim as new, and desire to secure by Letters Patent, is—

1. The combination with a rotatable spindle, of an expansible internally-tapered bobbin-clutch concentric therewith, split longitudinally from one to the other end and having an annular, external enlargement at its lower end, and a tapering clutch-expander fast on the spindle within the clutch, longitudinal movement of the latter upon the expander acting to expand the clutch into driving engagement with a bobbin when the same is applied to the clutch.

2. A rotatable spindle having fast thereon a conical expander, a longitudinally-split and laterally-expansible bobbin-clutch loosely surrounding the expander and internally tapered, a bobbin-rest on the clutch, and a stop to prevent removal of the clutch when a bobbin is removed, downward movement of the clutch causing it to grip the expander and to effect internal driving engagement with a bobbin when applied thereto.

In testimony whereof I have signed my name to this specification in the presence of two subscribing witnesses.

WILLIAM E. ALLEN.

Witnesses:
 LOUIS C. SMITH,
 ELIZABETH R. MORRISON.